United States Patent Office 2,978,295
Patented Apr. 4, 1961

2,978,295
RECOVERY OF PLUTONIUM BY CARRIER PRECIPITATION

Robert H. Goeckermann, Princeton, N.J., assignor to the United States of America as represented by the United States Atomic Energy Commission No Drawing. Filed Mar. 13, 1952, Ser. No. 276,445

2 Claims. (Cl. 23—14.5)

This invention deals with an improvement in the recovery of plutonium by carrier precipitation and in particular by precipitation as the peroxide.

When $U^{238}$ is bombarded with slow neutrons in a neutronic reactor, plutonium and the so-called fission products are formed. The fission products comprise elements of atomic numbers between 30 and 64. The neutron-irradiated uranium is usually processed to recover the plutonium as well as the fission products; the latter are needed for many scientific and medical purposes, for instance, for medical studies and applications.

Many methods are available for the separation of plutonium from fission product values. One of the preferred methods is based on the precipitation of the plutonium values from nitric acid solutions in the form of the peroxide, $PuO_4$, e.g., with hydrogen peroxide. While the hydrogen peroxide precipitates the plutonium values, most of the fission product values and uranyl values remain in solution. Details of the peroxide precipitation process can be found in the assignees' copending application, Serial No. 474,062, filed by Glenn T. Seaborg and Isadore Perlman on January 30, 1943, granted as U.S. Patent No. 2,852,336 on September 16, 1958.

It was found that the presence of one of the fission products, namely, that of zirconium, greatly inhibits the precipitation of plutonium and thus impairs the yield. Moreover, some of the zirconium was found to precipitate together with the plutonium which impaired the purity of the product obtained and made a repetition of the separation process cycle necessary. Besides, the fission products emit harmful γ-rays, and contamination of plutonium with fission products is most undesirable also for this reason.

It is an object of this invention to provide a process for the separation of plutonium from fission product values by which the above listed disadvantages are overcome.

It is another object of this invention to provide a process for the precipitation of plutonium from solutions containing zirconium by which the inhibiting effect on the plutonium precipitation is prevented.

It is another object of this invention to provide a process for the recovery of plutonium values from aqueous solutions by which the yield is improved.

It is still another object of this invention to provide a process for the recovery of plutonium values from aqueous solutions by which a product of high purity is obtained.

It is finally another object of this invention to provide a process for the separation of plutonium from fission product values contained in aqueous solutions by which the number of separation cycles necessary is a minimum.

These and other objects are accomplished by adding to a nitric acid solution containing the values to be recovered a fluorine anion-containing substance. The fluorine exerts a complexing function on the zirconium whereby the precipitation-inhibiting effect of the zirconium is eliminated. The complex probably corresponds to $ZrF_6^=$ and is very stable. The zirconium anion does not impair the plutonium precipitation directly, and consequently a very high yield and a practically zirconium-free product are obtained.

In order to demonstrate the effect of the fluorine anion, a number of experiments were carried out with an excess of hydrogen peroxide and varying fluoride contents. The solution was a regular plant solution and contained 8.25 gms. Pu/l. and nitric acid in a concentration of 1.0 N. The hydrogen peroxide was used in the form of a 30 percent aqueous solution and in a quantity of about 0.5 l. per 1 liter of plutonium-containing solution. The results of these experiments are compiled in Table I.

Table I

| F (mg./ml.) | Product yield percent |
|---|---|
| 0.0 | Ppt. dissolved |
| 1.6 | 89 |
| 3.3 | 88 |
| 2.5 | 93.8 |
| 4.6 | 92.5 |

This table shows that without any fluoride the precipitate formed dissolved again while with fluorine contents between 1.6 and 4.6 mg./ml. of solution a yield of from 88 to 93.8 percent was obtained.

All water-soluble peroxides are suitable for the process of this invention; however, hydrogen peroxide is preferred. Hydrogen peroxide has the advantage that no foreign ions are introduced with it and that adjustment of acidity is easier because it does not cause a change of the pH value.

Hydrogen peroxide is usually employed in the form of the commercially available 30 percent solution. An excess should always be used, and it has been found that the quantity should be sufficient to leave, after precipitation, a concentration of at least 10 percent hydrogen peroxide in the solution.

The acidity of the solution was also found to have a bearing on the yield of the process. This was ascertained in a series of experiments in which the solution always had the same fluoride content, namely, 3.3 mg./l. while the acid content was varied. The experimental data and the results of these experiments are summarized in Table II.

Table II

| Acid concentration (N) | Product Yield (percent) | Solubility (mg./ml.) |
|---|---|---|
| 1.5 | 91.4 | 480 |
| 0.9 | 95.3 | 260 |
| 0.7 | 96.1 | 210 |
| 0.5 | 96.7 | 180 |
| 0.4 | 96.4 | 200 |
| 0.2 | 96.0 | 220 |

These tests show that a nitric acid concentration of between 0.2 and 1 N yielded the best results; the preferred range was between 0.5 and 0.6 N.

It is advantageous to carry out the precipitation at elevated temperature, and the range between 55° and 65° C. was found best. It is also advisable to allow the mixture, after precipitation, to stand for from 20 minutes to 1 hour whereby precipitation is completed. Agitation was found to be helpful when used during this "digestion" period. The hydrogen peroxide may be added all at once, but addition in installments was found to give very good results. For instance, adding the bulk of the quantity of hydrogen peroxide necessary, e.g., about 80 percent thereof, then digesting for about one-half hour while agitating the mixture and holding the temperature at 55° to 65° C., followed by incorporating the remaining 20 percent of hydrogen peroxide and another one-half hour of digestion was one preferred way of carrying out the process of this invention.

The invention is useful in the precipitation of plutonium as the peroxide per se and it is equally well applicable to carrier precipitation of plutonium peroxide, e.g., on thorium peroxide. The plutonium peroxide precipitation on a thorium peroxide carrier is described in detail in the above-mentioned U.S. Patent No. 2,852,336.

It will be understood that this invention is not to be limited to the specific details given herein but that it may be modified within the scope of the appended claims.

What is claimed is:

1. A process of recovering plutonium values from an aqueous nitric acid solution containing said values together with zirconium values, comprising adjusting the acidity to a concentration of from 0.2 to 1 N; adding fluoride anions to said solution in a quantity of 1.5 to 5 mg. per liter of solution; adding hydrogen peroxide in a quantity excessive by at least 10% of that required for the precipitation of said plutonium values; and digesting said mixture at a temperature of from 55 to 65° C. before separation of the precipitate.

2. The process of claim 1 wherein the aqueous nitric acid solution contains 8.25 grams of plutonium per liter, the nitric acid concentration is 1 N, fluoride anion is added in a quantity to correspond to about 2.5 mg./ml. and hydrogen peroxide is added in the form of a 30% solution and in a quantity of 0.5 liter per liter of solution.

References Cited in the file of this patent

UNITED STATES PATENTS

| | | |
|---|---|---|
| 2,514,115 | Angerman | July 4, 1950 |
| 2,852,336 | Seaborg et al. | Sept. 16, 1958 |
| 2,877,090 | Finzel | Mar. 10, 1959 |

OTHER REFERENCES

Coryell et al.: Radiochemical Studies: The Fission Products, Book 3, pp. 1507–9 (1951), pub. by McGraw-Hill, New York.

Harvey et al.: Journal of the Chemical Society, London, pp. 1010–1021 at 1012 (August 1947).